(12) United States Patent
Baker

(10) Patent No.: US 8,149,260 B2
(45) Date of Patent: *Apr. 3, 2012

(54) METHODS AND SYSTEMS FOR PRODUCING SEAMLESS COMPOSITE IMAGES WITHOUT REQUIRING OVERLAP OF SOURCE IMAGES

(75) Inventor: Henry Harlyn Baker, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1539 days.

This patent is subject to a terminal disclaimer.

(21) Appl. No.: 11/591,081

(22) Filed: Oct. 31, 2006

(65) Prior Publication Data

US 2008/0100697 A1    May 1, 2008

(51) Int. Cl.
*H04N 7/14* (2006.01)
(52) U.S. Cl. ..................... 348/14.08; 382/284

(58) Field of Classification Search ............... 348/14.08, 348/14.09, 218.1; 382/284
See application file for complete search history.

(56) References Cited

U.S. PATENT DOCUMENTS 7,619,658 B2 * 11/2009 Baker et al. ................. 348/218.1
2006/0104541 A1 * 5/2006 Baker et al. .................. 382/284

* cited by examiner

*Primary Examiner* — Stella Woo

(57) ABSTRACT

A method for color blending seamless composite images without requiring overlap of source images is disclosed. A plurality of source images is acquired from a plurality of imagers and is combined to produce a seamless composite image. Moreover, a first reference location is selected in a first source image and a second reference location is selected in a second source image of the composite image. Color transform interpolation is then performed between the reference location in the first source image and the reference location in the second and other source images to produce a seamless color blended composite image without requiring overlap of image regions of the plurality of source images.

20 Claims, 20 Drawing Sheets

100

1200

```
COMBINES THE PLURALITY OF SOURCE IMAGES FROM
A PLURALITY OF IMAGERS TO PRODUCE A SEAMLESS
COMPOSITE IMAGE.
1202
```

↓

```
SELECTS A FIRST REFERENCE LOCATION IN A FIRST
SOURCE IMAGE AND A SECOND REFERENCE
LOCATION IN A SECOND SOURCE IMAGE OF
THE COMPOSITE IMAGE.
1204
```

↓

```
PERFORMS A COLOR TRANSFORM BETWEEN THE
REFERENCE LOCATION IN THE FIRST SOURCE IMAGE
AND THE REFERENCE LOCATION IN THE SECOND
SOURCE IMAGE TO PRODUCE A SEAMLESS COLOR
BLENDED COMPOSITE IMAGE WITHOUT REQUIRING
OVERLAP OF IMAGE REGIONS OF THE PLURALITY OF
SOURCE IMAGES.
1206
```

METHODS AND SYSTEMS FOR PRODUCING SEAMLESS COMPOSITE IMAGES WITHOUT REQUIRING OVERLAP OF SOURCE IMAGES

TECHNICAL FIELD

Embodiments of the present invention pertain to methods and systems for producing seamless composite images without requiring overlap of source images.

BACKGROUND ART

The creation of composite images (e.g., mosaicking) involves combining source images captured from a plurality of camera viewpoints. The source images are derived from viewpoint associated video streams and are used to form the composite image. A conventional approach to the creation of composite images involves finding points that correspond in the contributing images and computing stitching homographies that relate their perspectives. This approach derives from the situation where images are collected from arbitrary positions, such as in hand held capture. There, the features for deriving each homography must come from the acquired images themselves. If the camera views share a center of projection, the features can be chosen from anywhere in the overlapping images and their homographies will be valid throughout the scene viewed.

The quality of a composite image is constrained by the imagery that is used in its creation. It should be appreciated that the resolution involved and the number of viewpoints that are considered are important factors that impact the creation of composite images. The greater the resolution and number of viewpoints provided the greater the spatial resolution of the resultant composite image. While digital still cameras are reaching mega-pixel dimensions at nominal cost (e.g., providing increasingly high resolution images), the spatial resolution provided by digital video systems lags far behind that offered by digital still cameras.

Another constraint of composite imagery is the direct affect of differences in illumination, shading, and the like. Specifically, combining imagery to form a composite image usually requires significant overlap between the images in order to reduce the visual disparities, such as color variations, illumination differences, shadows, and the like, between the two combined images.

DISCLOSURE OF THE INVENTION

A method for color blending seamless composite images without requiring overlap of source images is disclosed. A plurality of source images is acquired from a plurality of imagers and is combined to produce a seamless composite image. Moreover, a first reference location is selected in a first source image and a second reference location is selected in a second source image of the composite image. A color transform is then performed between the reference location in the first source image and the reference location in the second source image to produce a seamless color blended composite image without requiring overlap of image regions of the plurality of source images.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 12 is a flowchart of a method for color blending seamless composite images without requiring overlap of source images according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the following discussion the term "composite image" is intended to refer to an image that is formed from two or more acquired or captured images. Moreover, the term "mosaicking" is intended to refer to the process of creating seamless composite images. The term "source image" is intended to refer to images from which a composite image is formed. The term "imager" is intended to refer to a component of a camera system that captures images. The term "homography" is intended to refer to a mathematical object that relates the perspectives of source images. In one embodiment, these homographies are determined by constraints shared by source images and are utilized to combine those source images seamlessly.

Figure 1A:
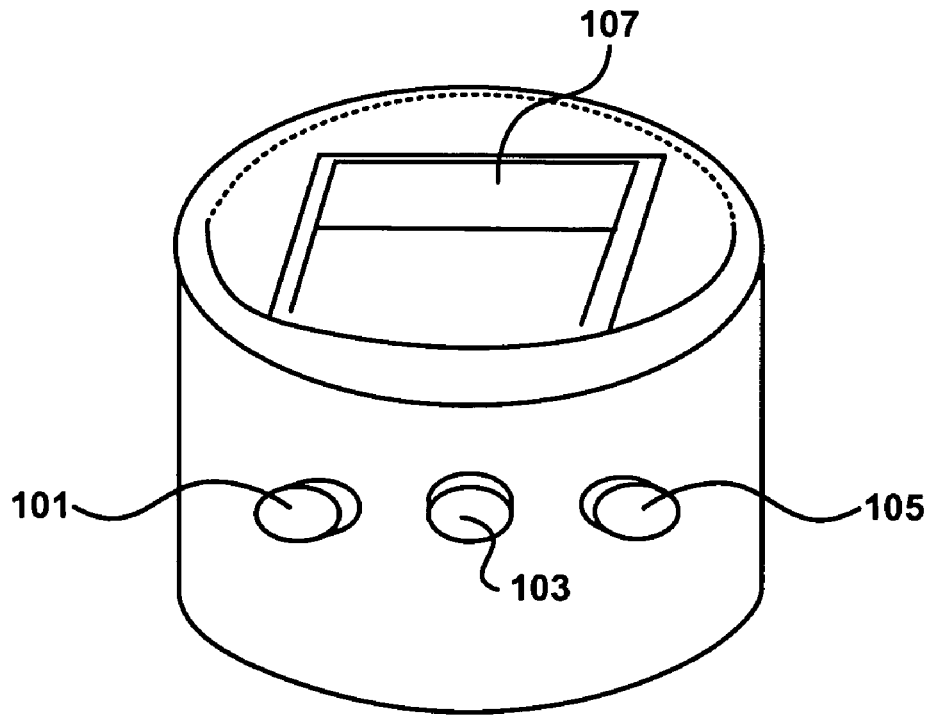
FIG. 1A shows a camera system that produces seamless composite images without requiring overlap of the source images that constitute each composite image according to one embodiment of the present invention.
Figure 1B:
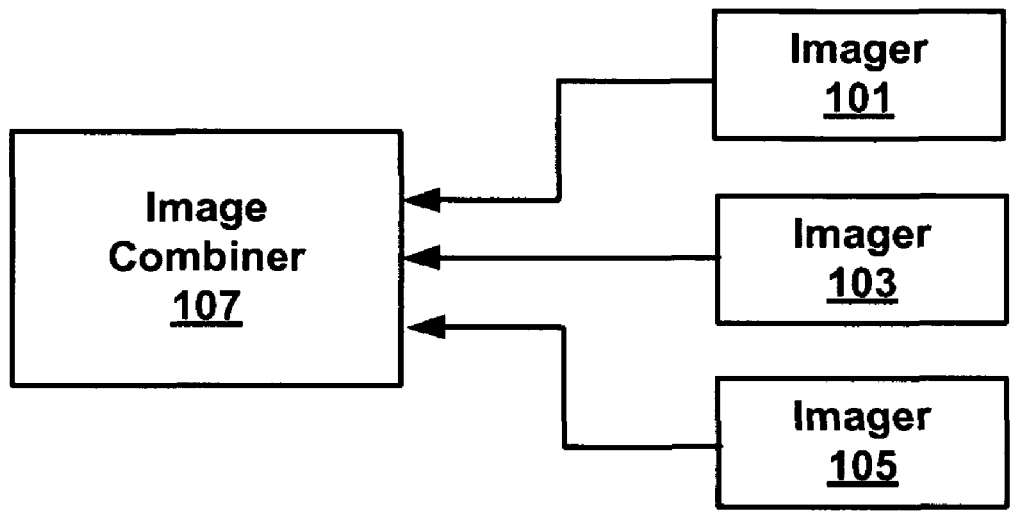
FIG. 1B shows a block diagram of a camera system that produces seamless composite images without requiring overlap of the source images that constitute each composite image according to one embodiment of the present invention.

System for Producing Seamless Composite Images According to One Embodiment of the Present Invention FIG. 1A shows a camera system 100 that produces seamless composite images without requiring overlap of the source images that constitute each composite image according to one embodiment of the present invention. A block diagram 100A of camera system 100 is shown in FIG. 1B. In the present embodiment, the composite images are formed by combining a plurality of source images that are captured using a plurality of imagers according to one embodiment of the present invention. In the FIG. 1A embodiment, camera system 100 includes imagers 101-105 and image compositor 107.

Imagers 101-105 capture respective source images from the respective viewpoints of the imagers 101-105. The captured source images are combined to form seamless composite images (e.g., virtual images, mosaic images etc.). The composite images are created using source images that correspond to respective image streams that are generated by the respective imagers 101-105. The composite images that are created using the captured images can yield a panoramic view that can not be derived from any of the individual views.

While one embodiment of the system may have a common plane arranged front to-parallel to the camera views, in which case the individual lenses of the imagers will all be focused at about the same distance. It should be appreciated that the focal distances of the lenses of imagers 101-105 may be set independently to accommodate an orientation of a common plane that is not orthogonal to their general view direction. Although camera system 100 is depicted in FIG. 1 as including three imagers, other arrangements that include other numbers of imagers can be employed according to exemplary embodiments. In one embodiment imagers can be employed as a part of a pan tilt zoom (PTZ) imaging system that provides frame selection within the composite image.

In exemplary embodiments, the relationship of captured (e.g., acquired) images can be fixed before capture. When the relationship of captured images is fixed before capture, dynamic registration can be replaced by once only analysis. In one embodiment, imagers 101-105 are configured beforehand for a desired panorama-shaped image, and the known relationship of the imagers 101-105 is used to repeatedly compose the frame in real time at minimal central processing unit (CPU) cost.

Combiner 107 combines the source images that are acquired by imagers 101-105 to produce a seamless composite image (e.g., virtual image, mosaic image etc.). In one embodiment, the composite image is created in a manner that does not require overlap of an image region of the acquired image. In one embodiment, this is accomplished by using line features to combine the source images (see discussion made with reference to FIG. 3). The line features enable the combiner 107 to identify relationships that exist among the source images that can be utilized to combine the source images seamlessly.

Figure 1C:
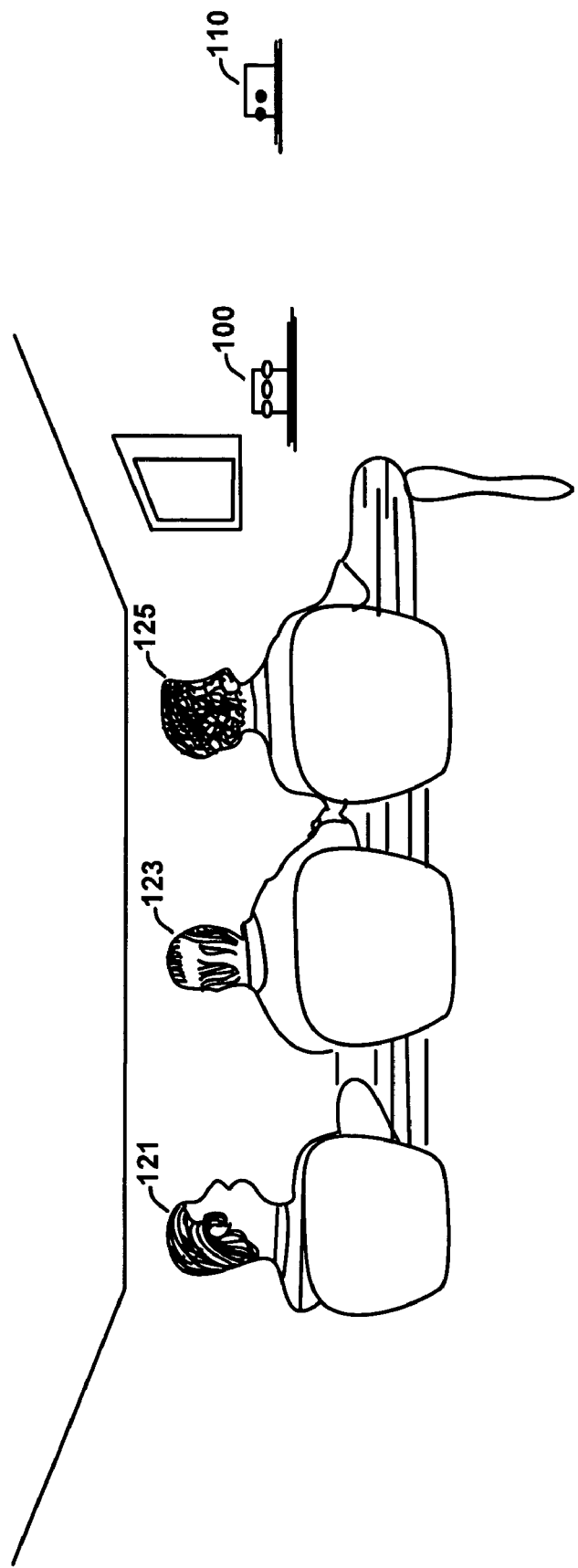
FIG. 1C illustrates the imaging of seated conferees participating in a video conferencing session using a camera system for producing seamless composite images without requiring overlap of acquired images according to one embodiment of the present invention.

In operation, camera system 100 can be situated so that objects that are desired to be imaged are located within its imaging plane, e.g., plane of focus POF, shared or common observation plane, etc., (see discussion made with reference to FIG. 1C). In one embodiment, a plurality of imagers is configured to capture respective source images from respective portions of the shared observation plane. In the present embodiment, seamless composite images are formed by combining the source images using a resampling mechanism that utilizes homographies based on line features.

It should be appreciated that the size of the view angle that can be imaged by camera system 100 is significantly increased as compared to conventional systems because it does not rely on image overlap to produce composite images. The larger view angle allows the imaging of panoramas that cover a wider measure of space. For this reason a plurality of lower resolution imagers can be used to produce panoramas that have increased spatial resolution for the number of imagers that are provided. Consequently, greater spatial resolution can be achieved with less additional bandwidth.

In one embodiment, the line features that are used can be visible in (and in some cases extend across) several images and can provide correspondences between the images that eliminates the necessity of having significant overlapping of the source images from which a composite image is formed (see discussions made herein).

In one embodiment, because the presence of overlap can be limited to operations that ensure the continuity of the composite image, the presence of overlap can be minimized. Moreover, because a series of source images that do not overlap can cover a wider angle than the same number of similarly formatted source images that do overlap, the number of imagers that are necessary to cover space desired to be imaged can be reduced. This feature of exemplary embodiments of the present invention minimizes the number of imagers that is required to construct a desired panoramic view. It should be appreciated that this maximizes both the usefulness of acquired pixels and the efficiency of the image processing (capacity to image a wider angle using fewer imagers).

In one embodiment, the creation of seamless composite images (e.g., video mosaicking) can be employed to capture panoramic views (e.g., wide angled and unbroken views) of video conferencing participants for presentation at remote sites. In such embodiments the observations from several multi-viewpoint imagers are combined to simulate the performance of a much costlier mega-pixel video camera. The result can be reformatted to a desired panoramic view shape.

Figure 1D:
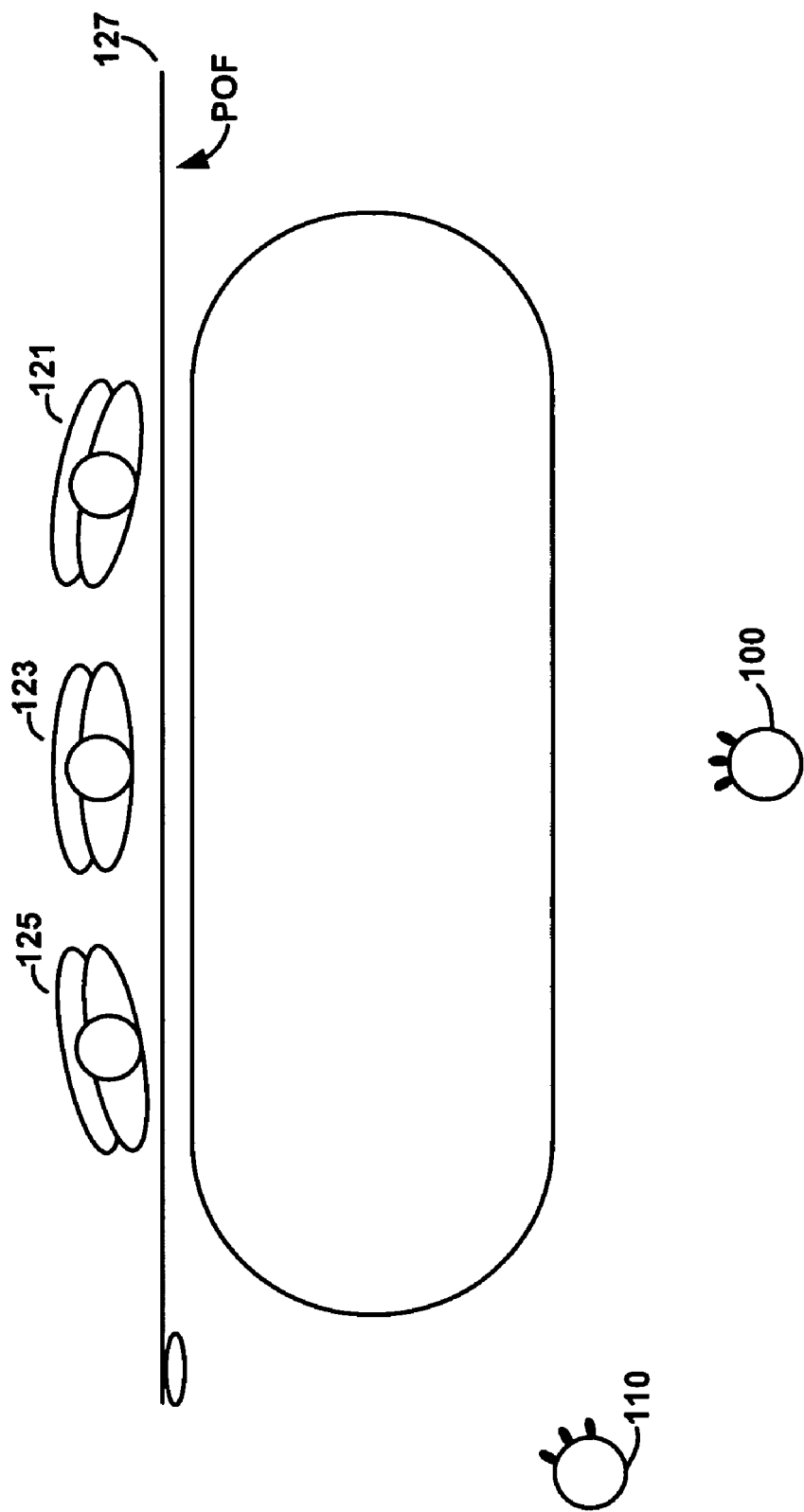
FIG. 1D is a top perspective view of conferees shown in FIG. 1B and illustrates the positioning of conference participants in the imaging plane of camera system according to one embodiment of the present invention.

FIG. 1C illustrates the imaging of seated conferees participating in a video conferencing session using a camera system 100 for producing seamless composite images without requiring overlap of acquired images. In FIG. 1C camera systems 100 and 110 are placed where seated conferees 121, 123 and 125 are located within their imaging planes, e.g., plane of focus (POF), (see reference 127 in FIG. 1D) of camera systems 100 and 110 as is illustrated in FIG. 1D. FIG. 1D is a top perspective view of conferees 121, 123 and 125 shown in FIG. 1C and illustrates an exemplary positioning of conference participants for imaging in the imaging plane 127 of camera system 100. In one embodiment, imaging plane 127 is formed from a combination of the image planes of the imagers that are a part of camera system 100 and thus represents the common image plane of the imagers that are employed in camera system 100. In one embodiment the focal distances of the lenses of the imagers are set independently to accommodate an orientation of the common plane that is not orthogonal to their general view direction.

Figure 1E:
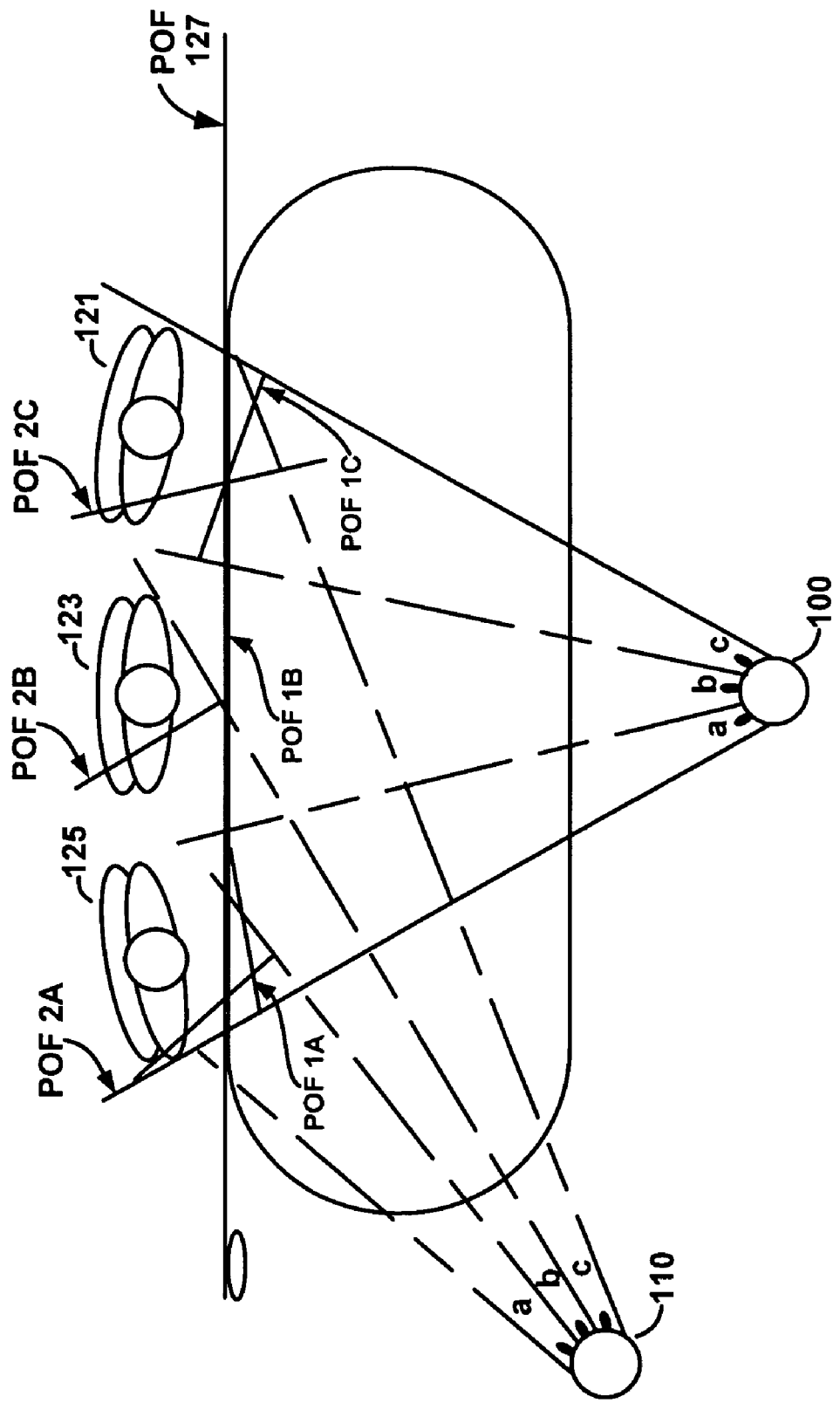
FIG. 1E illustrates how a common image plane is formed from the planes of focus of a plurality of imagers that are employed by multi-imager camera system according to one embodiment of the present invention.

FIG. 1E illustrates how a common image plane (e.g., 127) is formed from the POFs of a plurality of imagers (e.g., 101, 103 and 105 in FIG. 1A) that are a part of the multi-imager camera system 100. Referring to FIG. 1E, the image planes (POF1, POF2 and POF3) of the imagers that are employed in camera system 100 provide a common image plane 127. As mentioned above, for imaging purposes, the camera system 100 is positioned so that conferees are located in common image plane 127.

Figure 2:
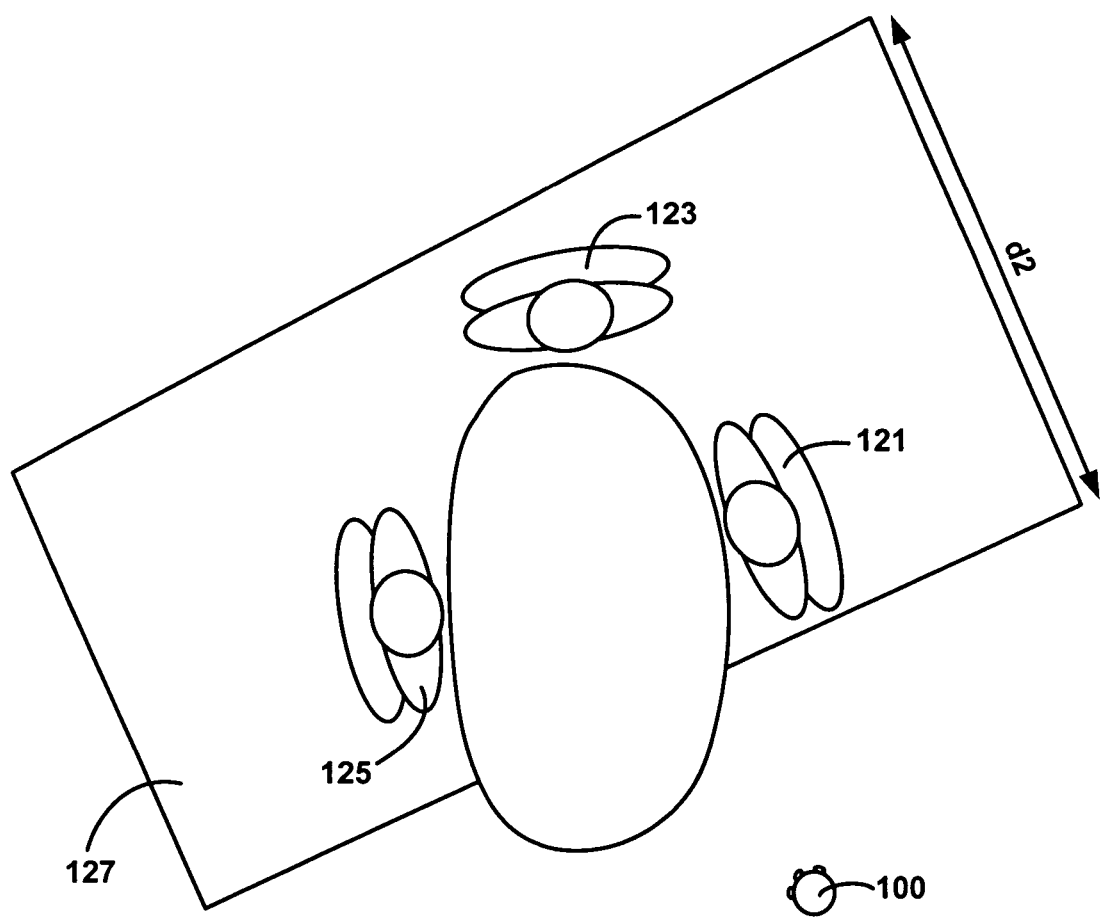
FIG. 2 is a top perspective view of conferees shown in a more circular configuration that that of FIG. 1C and illustrates the positioning of conference participants in a deeper imaging plane of the camera system according to one embodiment of the present invention.

FIG. 2 shows the conferees situated around a table. Their position might appear to make the homography invalid, since they do not lie in or near a plane—their separation is indicated as dZ (depth of focus). Nevertheless, this arrangement will be acceptably handled by the homography. If the centers of projection of the individual imagers of camera system 100 are sufficiently near each other.

The Use of Line Features

Figure 3:
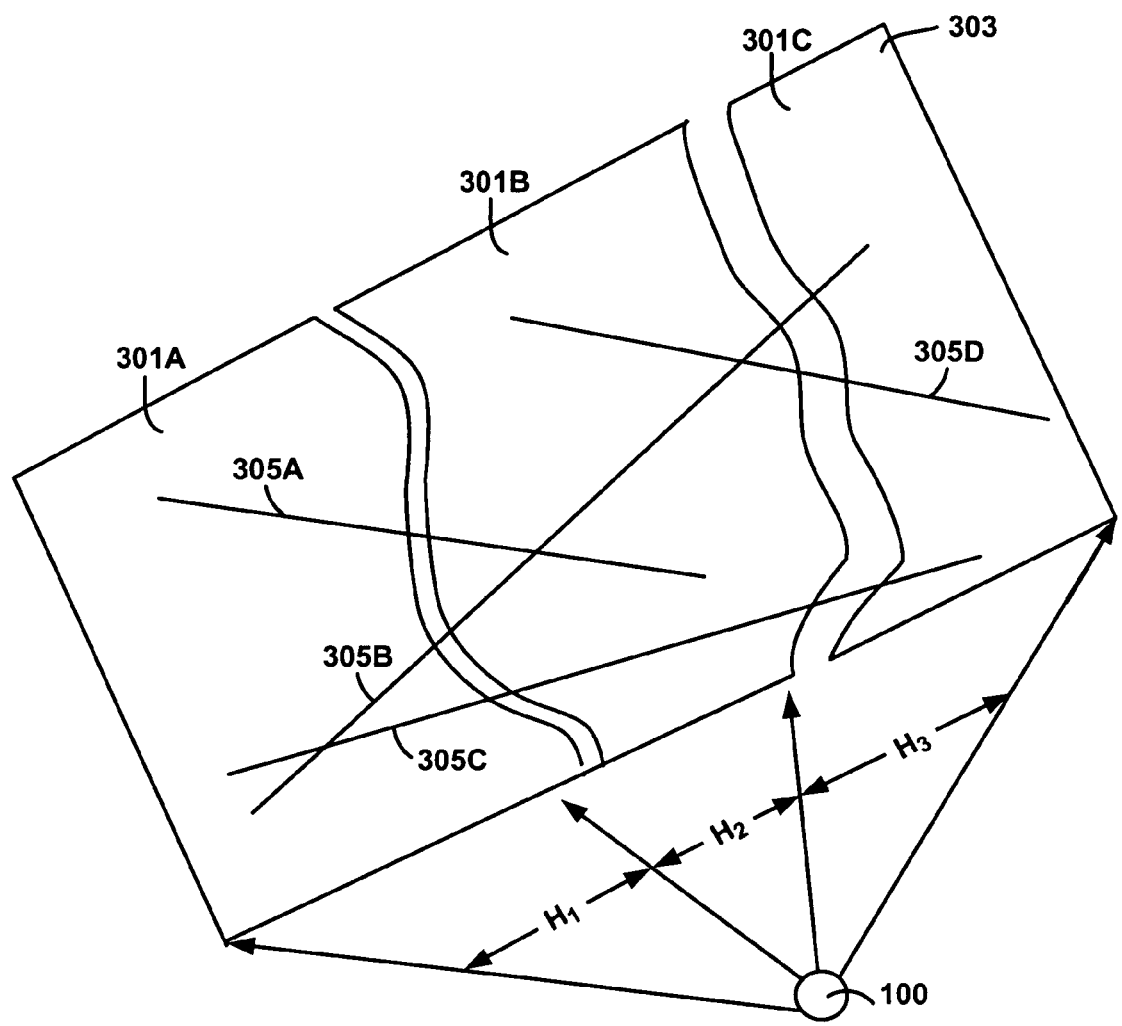
FIG. 3 shows source images captured by a multi-imager camera system and line features that are used to relate the source images according to one embodiment of the present invention.

FIG. 3 shows source images captured by a multi-imager camera system and line features that are used to relate the source images according to one embodiment of the present invention. FIG. 3 shows source images 301A-301C, calibration plane 303 and line features 305A-305D. FIG. 3 illustrates the use of line features 305A-305D which are projected into calibration plane 303 and used to identify relationships between source images 301A-301C. The relationships are used to generate a respective homography H1, H2 and H3 for respective source images 301A-301C.

It will be obvious to those skilled in the art that there is a certain number of such lines that must be observed and certain relations of independence that must be satisfied in order for the homography estimation process to be valid.

In exemplary embodiments, using line features 305A-305D, high-resolution wide-angled panorama views can be constructed from a minimum number of low-resolution imagers (e.g., 101-105 in FIG. 1). In such embodiments, an homography H relating two source images I and I' (for instance 301A and 301B) with corresponding points x and x' and lines l and l' is given by the equations:

$$x'=Hx$$

$$l'=H^{-1}l$$

Referring again to FIG. 3, since in one embodiment lines (e.g., line features 305A-305D) can be employed that are visible in (and in some cases extend across) several source images (e.g., 301A-301C), correspondences among source images 301A-301C can be identified without significant source image overlap. Since overlap is only needed for continuity of the resulting composite image, the need for overlap can be minimized (to zero) and the number of imagers (e.g., 101-105 in FIG. 1) needed to construct a desired panoramic view is reduced. In such embodiments, the usefulness of acquired pixels is maximized while processing is made more efficient.

It should be appreciated that the size of the view angle that can be imaged by a camera system (e.g., 100 in FIG. 1) employing the above described line feature image compositing methodology is significantly increased as compared to conventional systems because image overlap is not required in order to produce seamless composite images. The larger view angle allows the imaging of panoramas that cover a wider measure of space. For this reason, by employing the herein described methodology, a plurality of lower resolution imagers can be used to produce panoramas that have increased spatial resolution for the number of imagers that are provided. Consequently, greater spatial resolution can be achieved with less additional bandwidth.

It should be appreciated that lines are similar to points in that collinear lines are like lines of coincident points, parallel lines are like lines of collinear points, and a minimum of four observations in general position are needed to form an homography with eight degrees of freedom (in a preferred embodiment, many more can be used in order to improve precision and stability). However, the extended spatial support of line based solutions presents an added advantage over point-based solutions in that localization of a line is more robust. More specifically, when presented with the same number of observations of lines and points, better estimates can be generated using the lines.

Line Based Homographies

Figure 4A:
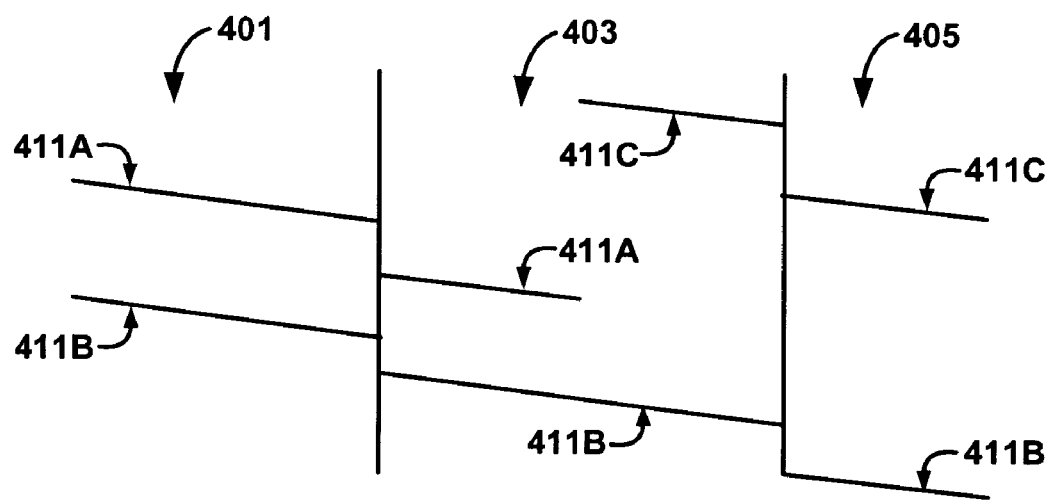
FIG. 4A illustrates the formation of a seamless composite image using line based homographies according to one embodiment of the present invention.
Figure 4B:
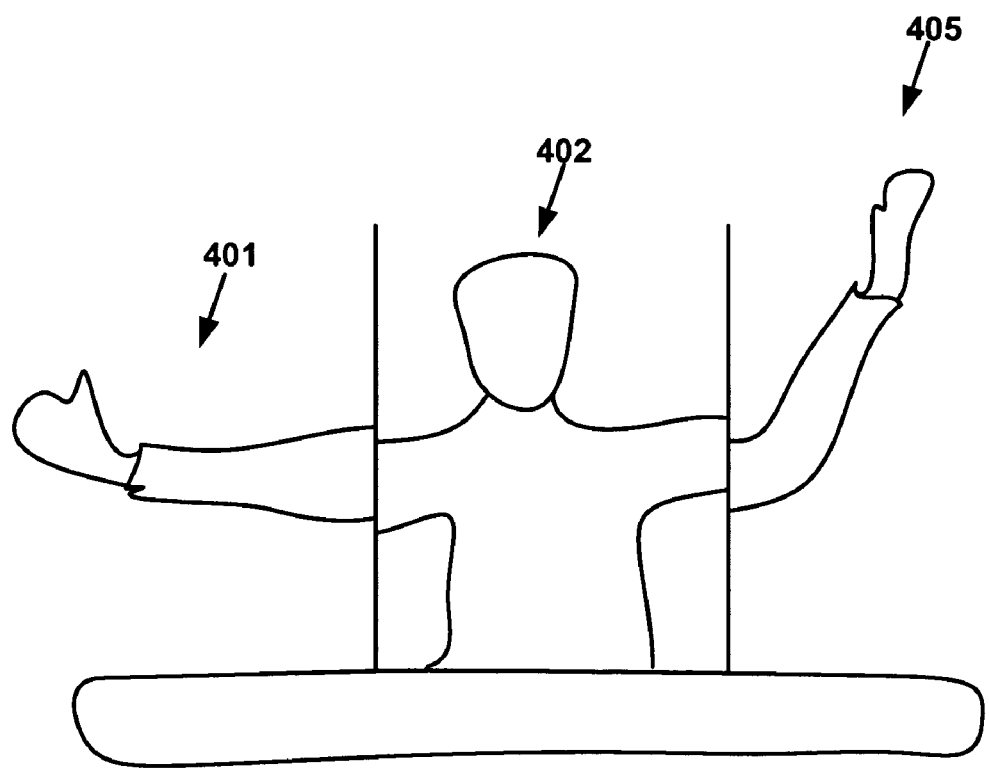
FIG. 4B illustrates the formation of a seamless composite image using line based homographies according to one embodiment of the present invention.
Figure 4C:
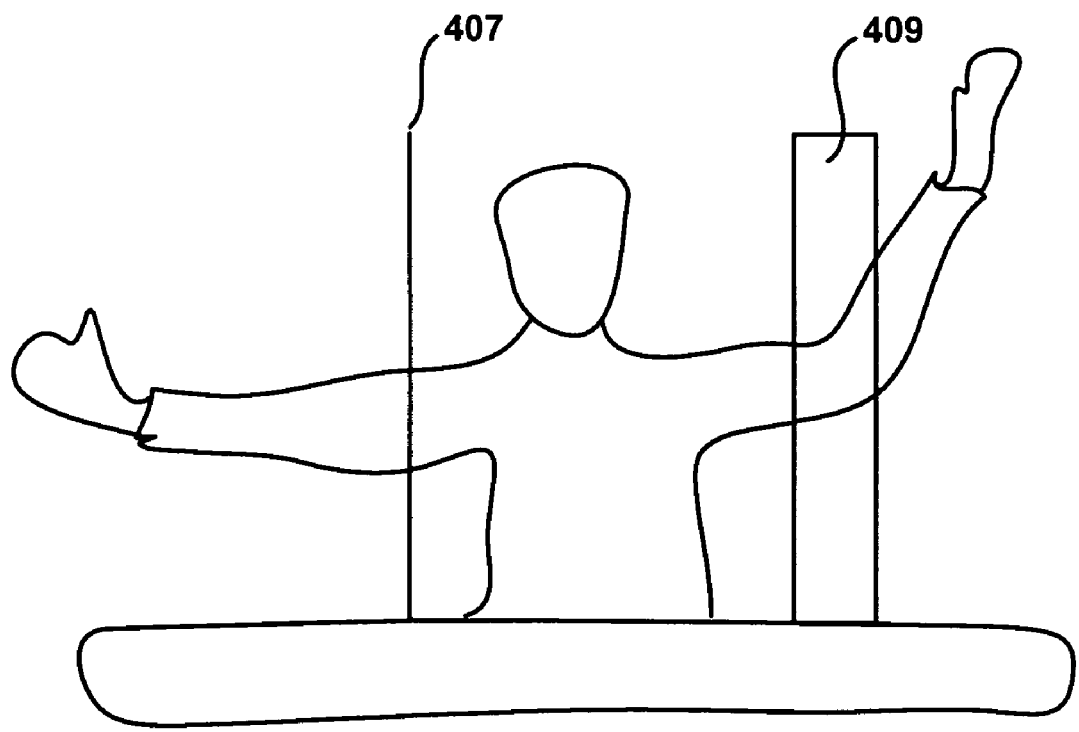
FIG. 4C illustrates the formation of a seamless composite image using line based homographies according to one embodiment of the present invention.
Figure 4D:
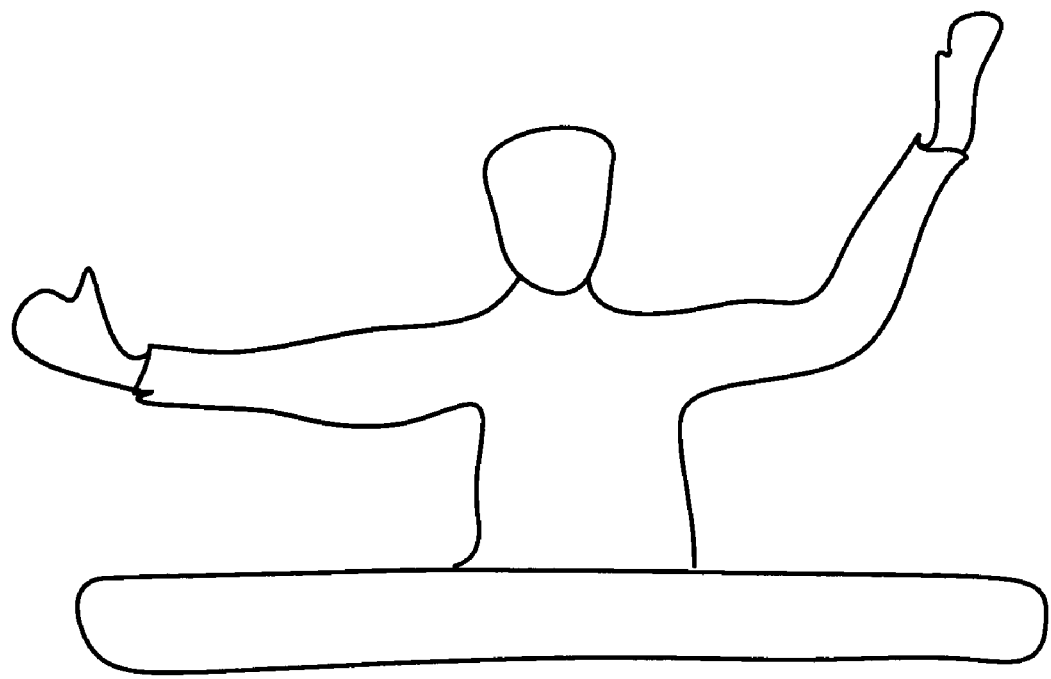
FIG. 4D illustrates the formation of a seamless composite image using line based homographies according to one embodiment of the present invention.

FIGS. 4A-4D illustrate the formation of a seamless composite image using line based homographies according to one embodiment of the present invention. FIG. 4B shows source images 401, 403 and 405 that contribute to the desired seamless composite image (e.g., mosaic) shown in FIG. 4D and the line features 411 (shown in FIG. 4A as line features 411A-411C) that relate the perspectives of source images 401, 403 and 405 from which homographies of source images 401, 403 and 405 are computed. FIG. 4C shows a view of the composite image without blending (unblended regions 407 and 409 are shown in FIG. 4B).

In one embodiment, homographies can be generated by: (1) projecting line features that are detectable by an imager array (see discussion made with reference to FIG. 3), (2) correcting the line features for lens distortion, (3) estimating line features using a least squares fitter, and (4) passing the line features to a homography solver. The homography from one imager (e.g., 101-105 in FIG. 1) to another can be derived as the transpose inverse of the solution determined by treating the homogeneous representation of each line as if it were a point and solving for the point-wise homography (see equation above).

It should be appreciated that in one embodiment lens correction and luminance and color adjustments are made to bring images into agreement on color and, brightness, and to correct for lens distortions. In such embodiments the geometric correction is part of the re-sampling, and the color and brightness corrections make the content photometrically more correct.

Alternately, the line based homography can be determined directly from the linear estimates. In one embodiment, having the homographies that relate one imager to another, allow the homographies to be chained together to determine the transforms that bring any involved imager into a global frame of reference. Initially, the global frame may be chosen as one of the imager frames (for instance the center imager). Subsequently, a derived global frame may be constructed that encompasses them all.

In one embodiment, a re-sampling mechanism (e.g., lookup table etc.) that contains pre-computed values that are used to compose a composite image from its contributing components is constructed after an output size within the dataset corresponding to a constructed frame is determined. The table can carry bilinear interpolation indices and weights that are used to compose each destination pixel. These indices map pixels that make up the resultant composite image through each imager homography and reposition the mapped point to account for any observed lens-induced curvatures. In one embodiment, the vast majority of pixels can be seen by only one imager. In cases where several imagers see a pixel, the contributions of the pixels can be blended. In one embodiment, the metric employed is linear interpolation (regions of overlap are determined, and the pixel weights of the contributing pixels seen by respective imagers are computed by distance from that source image's boundary).

Figure 5:
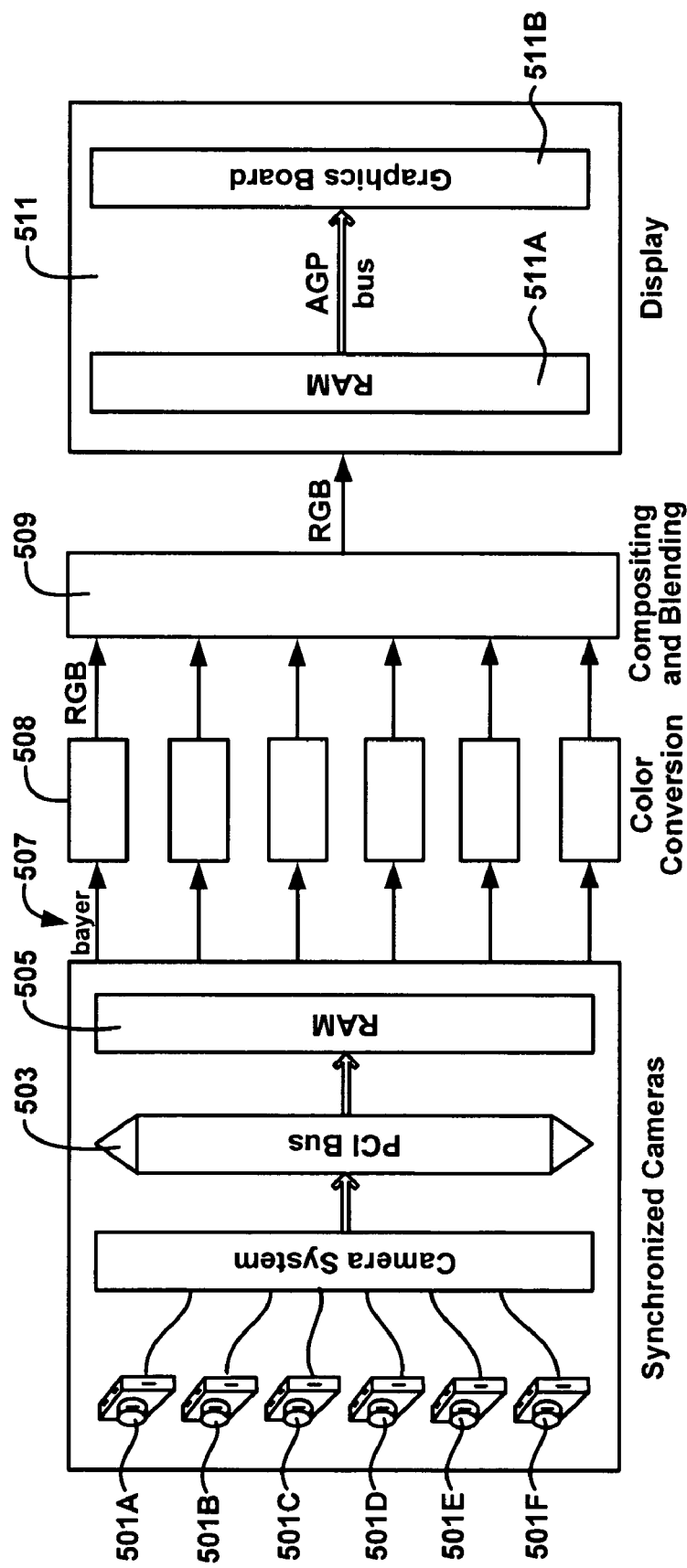
FIG. 5 shows an exemplary dataflow diagram illustrating the flow of video data where six video imagers are employed in a multi-imager camera system that employs central processing unit (CPU) processing according to one embodiment of the present invention.

CPU and GPU Based of Production of Seamless Composite Images According to One Embodiment CPU Based Production of Seamless Composite Images FIG. 5 shows an exemplary dataflow diagram illustrating the flow of video data where six video imagers are employed in a multi-imager camera system that employs CPU processing according to one embodiment of the present invention. FIG. 5 illustrates a beneficial bandwidth and computation distribution scheme where parallelized CPU processing is employed. In the FIG. 5 embodiment, synchronized imagers 501A-501F generate parallel streams of video data that are delivered to RAM storage units 505 via a bus 503 (e.g., PCI etc.). Subsequently, the digital video 507 receives parallelized color conversion 508 and compositing and blending (if necessary) 509 and is delivered to a display 511 that includes RAM storage units 511A and graphics board 511B.

In moving large amounts of digital video 507 current PC architectures are severely taxed. Real-time display of these data requires a judicious mix across peripheral component interconnect (PCI), PCI-X, and accelerated graphics port (AGP) buses distributed over multiple display cards, which present significant bandwidth challenges. In one embodiment, with these bandwidth issues in mind, a distributed parallelized processing scheme such as is illustrated in FIG. 5 can be employed that is enabled both by the multi-imager system performance exhibited by exemplary embodiments of the present invention and by the advanced graphics processing units (GPUs) that are available for modern PCs (see discussion below).

In one embodiment, the compositing of images can be performed by a PC processor that uses a re-sampling mechanism (e.g., lookup-table etc). As discussed above, computation can be parallelized to exploit multiple processors. In this embodiment, re-mapping can be designed to scale based on numbers of camera pixels and size of display.

GPU Based Production of Seamless Composite Images

Figure 6:
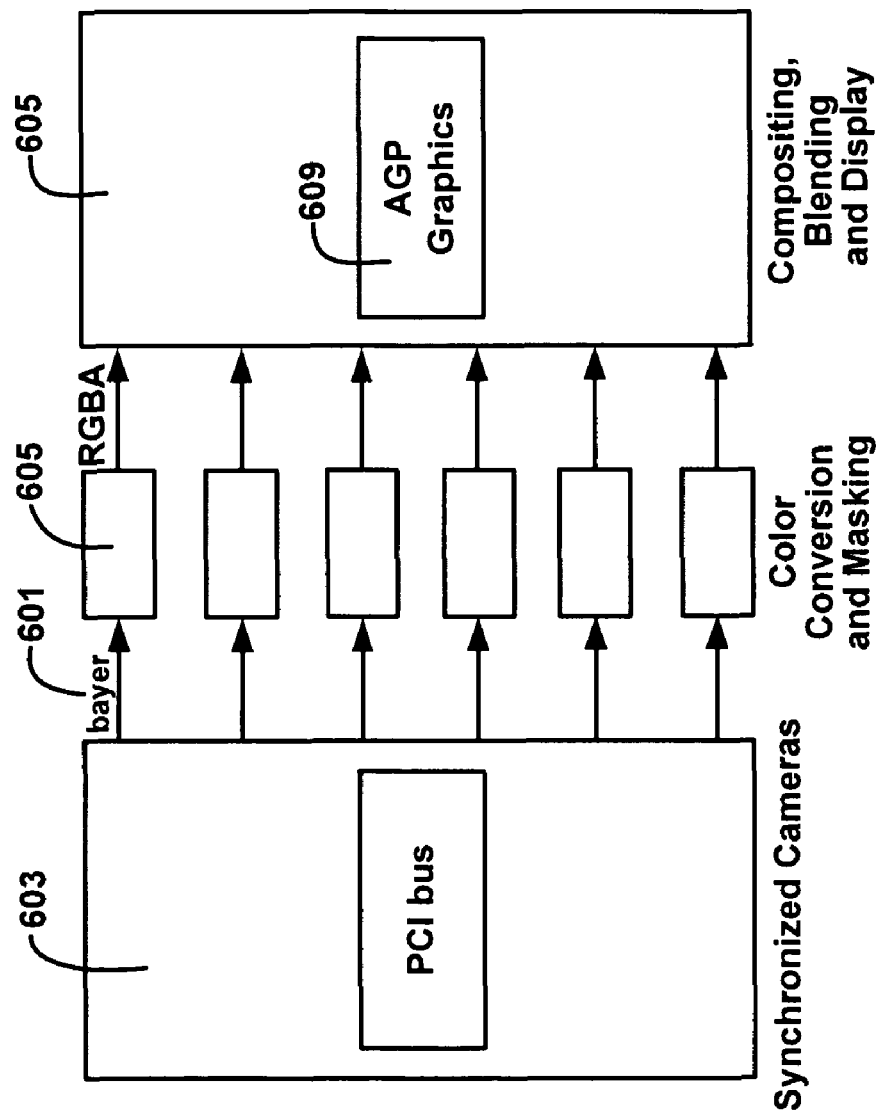
FIG. 6 illustrates an application of graphics acceleration according to one embodiment of the present invention.

FIG. 6 illustrates an application of graphics acceleration according to one embodiment of the present invention. FIG. 6 shows blocks that represent the video streams 601, which are generated by synchronized imagers, a data bus 603, color conversion operations 605, compositing/blending operations 607 and AGP graphics hardware 609. FIG. 6 illustrates an embodiment where compositing and blending operations 605 (e.g., mosaicking operations) are performed by the AGP graphics hardware 609 and preceded by CPU color conversion operations 605.

In the FIG. 6 embodiment, the use of graphics processing can be exploited for use in panorama building. In this embodiment, for display oriented tasks, re-sampling vectors can be treated as static image geometry and the streaming video can be treated as dynamic textures. In such embodiments, the static image geometry can be downloaded (reshaping the source images), allowing compositing and blending operations to be performed by the AGP graphics hardware 609 (e.g., GPU hardware). The subsequent video is streamed to the display.

In the FIG. 6 embodiment, GPU "mosaicking" can be performed considerably faster than CPU "mosaicking." In such embodiments, the CPU's task can be solely one of color converting the camera video from one format to another, and then passing the imagery to the graphics card. In another embodiment the processor load can be reduced even further by performing color re-sampling in the GPU rather than converting video into RGB before sending it to the graphics board. In this embodiment, bus bandwidth load can also be reduced which is an important consideration when cameras and displays share resources with other activities.

Another advantage of the GPU approach to "mosaicking" is that the cost of producing the composite image is independent of its size. By contrast, high costs are incurred for large images when CPU-based compositing is employed. In one embodiment, if the video stream is sent to a handheld device or ramped up for a very large display surface, the different scalings can be handled transparently in the graphics card.

In one embodiment, the graphics processing units (GPUs) of a PC can be used for the re-sampling to provide better scaling. In this embodiment, a beneficial computational use of available graphics processing is made. It should be appreciated that the use of graphics processing can be useful in display oriented applications.

Figure 7:
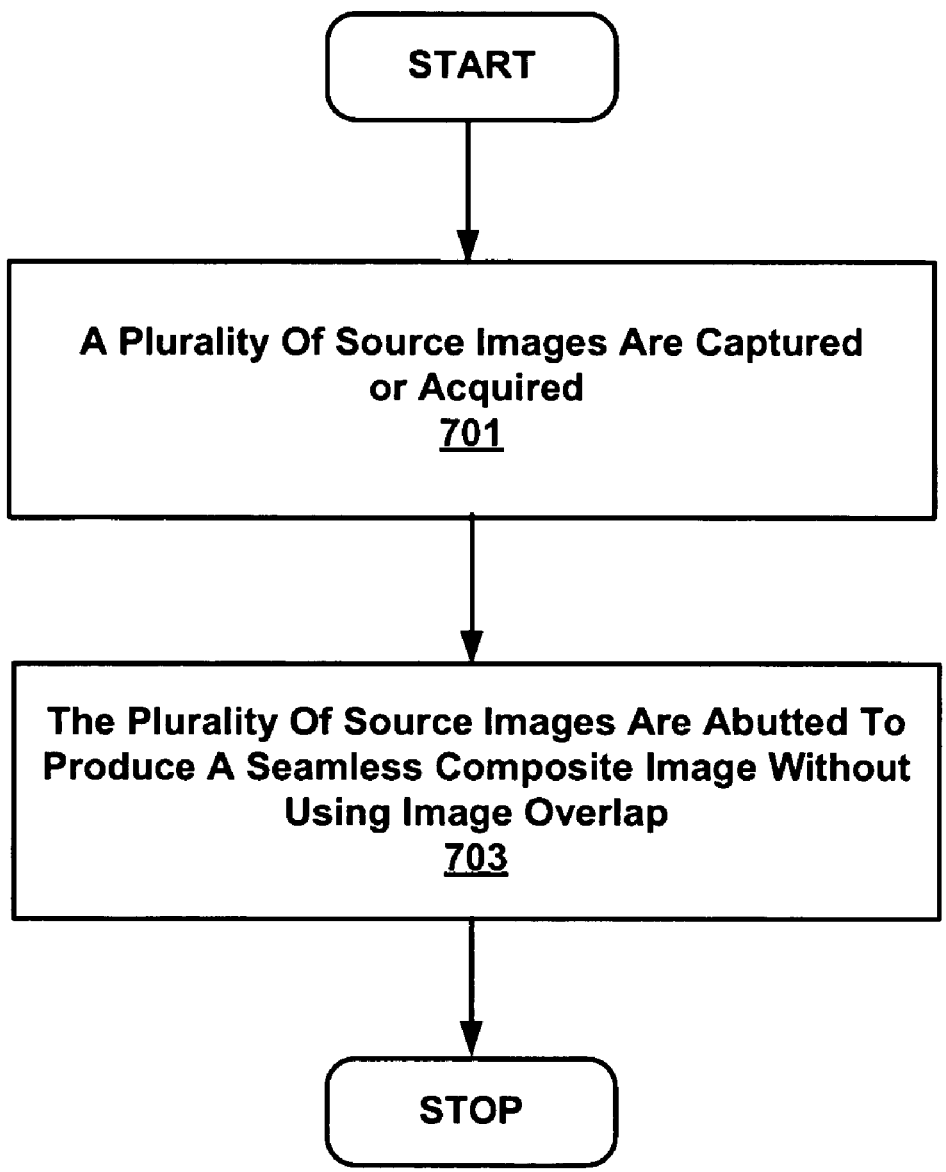
FIG. 7 shows a flowchart of the steps performed in a method of producing seamless composite images without using overlap of source images according to one embodiment of the present invention.

FIG. 7 shows a flowchart of the steps performed in a method of producing seamless composite images without using overlap of source images according to one embodiment of the present invention.

At 701, a plurality of source images are acquired (e.g., captured, imaged etc.).

At 703, the plurality of source images are combined to produce a seamless composite image. In one embodiment, the combining of the plurality of source images to produce a seamless composite image is performed without requiring overlap of image regions of the plurality of source images.

It should be appreciated that by employing the methodology described with reference to FIG. 7 the size of the view angle that can be imaged is significantly increased as compared to conventional systems because the methodology of FIG. 7 does not rely on image overlap to produce composite images. The larger view angle allows the imaging of panoramas that cover a wider measure of space. For this reason a plurality of lower resolution imagers can be used to produce panoramas that have increased spatial resolution for the number of imagers that are employed. Consequently, greater spatial resolution can be achieved with less additional bandwidth.

Figure 8:
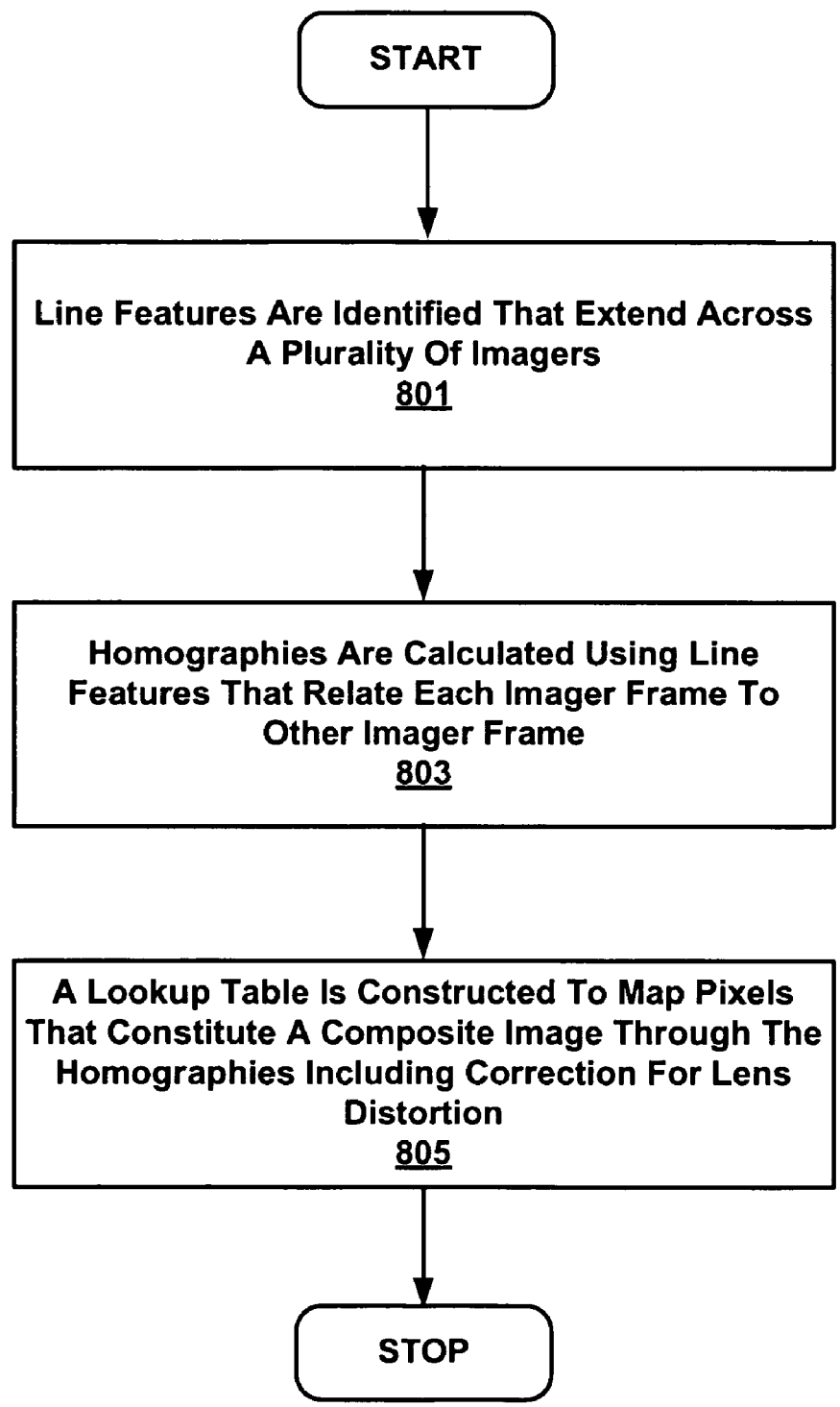
FIG. 8 shows a flowchart of the steps performed in a method for calibrating a plurality of imagers to produce a seamless composite image without using overlap of source images according to one embodiment of the present invention.

FIG. 8 shows a flowchart of the steps performed in a method for calibrating a plurality of imagers to produce a seamless composite image without requiring overlap of source images according to one embodiment of the present invention.

At 801, line features are identified that are observed in (and perhaps extend across) each imager frame of said plurality of imagers.

At 803, homographies are calculated using the line features that relate each imager frame of the plurality of imagers to at least one other imager frame of the plurality of imagers.

At 805, a lookup table is constructed that is used to map pixels that constitute the composite image through the correction of lens distortions and the use of homographies.

In exemplary embodiments data can be composited, for example, in both VGA and extended graphics array (XGA) format into linear mosaics in real time. In one embodiment, at distances of about ten feet from cameras to conference participants, satisfactory planar homographies can be computed. In an alternate embodiment, satisfactory planar homographies can be computed at other distances. In one embodiment, blending makes "ghosting" that can appear from distant objects that lie away from the calibration plane, nearly unnoticeable. In a realized embodiment, images are produced by three-imager "mosaicking" were judged comparable with those from a broadcast-quality digital video camera that costs significantly more.

Color Blending Seamless Composite Images without Requiring Overlap of Source Images The following is an overview of one embodiment for color blending seamless composite images without requiring overlap of the source images. As described herein, the present technology produces a high resolution composite image from a number of lower resolution imagers. Moreover, in one embodiment, the high resolution image is formed with minimum or no overlap between the source images. As detailed herein, by forming the high resolution composite image with minimum or no overlap, a significant saving in pixels is realized.

However, in a composite image formed utilizing two distinct sources of imagery, there is an opportunity for a first imaging device, e.g., imager 101, of FIG. 1B, to provide a first portion of an image having a first color based on its illuminant and color processing and a second imaging device, e.g., imager 102, of FIG. 1B, to provide a second portion of the same image having a second color based on its illuminant and color processing. If the source images are simply combined using the image combiner 107, there is an opportunity for the seamless composite image to have obvious visual chroma artifacts, inconsistent border colorations and the like.

The present technology resolves the problem and permits color renditions from multiple imagers to be consistent, correct, and relatively free of visual chroma artifacts as the source images become a composite image. In one embodiment, the imagers are initially calibrated so that individual color correction transforms can be determined. For example, the imagers, e.g., 101-103, may be calibrated using a color target chart, black and white values (to establish device black and white points), color samples, an object in each imagers field of view, or the like. This calibration will allow the plurality of imagers to provide source images having fairly consistent luminance and color qualities.

To further reduce the inconsistency between source images, reference locations are selected within the source images making up the composite image. For example, a reference location 1 is established in a first source image within the composite image and a reference location 2 is established in a second source image within the composite image. Individual color correction transforms are then determined in the direction between reference location 1 and reference location 2. The transforms are then interpolated in the direction between reference location 1 and reference location 2 such that the source images are color blended resulting in a composite image that is consistent and visually free of chroma artifacts.

For example, the color transform may be a linear interpolation, an S-curve interpolation, or the like. For example, in a linear interpolation when the color transform is performed at reference location 1, the result is that the color is not (or minimally) transformed with reference location 2 having little or no input. However, as the color transform moves along the direction between reference locations 1 and 2, the input weight of both reference locations will change. For example, at ¼ of the distance between reference locations 1 and 2 the corrected color transform will utilize ¾ the color transform of reference location 1 and ¼ the color transform of reference location 2. This will continue across the threshold until the color transformer reaches reference locations 2 at which point, the color transform at reference location 2 is not (or minimally) transformed with reference location 1 having little or no input.

In so doing, the entire distance between the two reference locations will be smoothly blended without requiring overlap between the source images. Moreover, the color transformer will continue to perform the color transform between reference location 1 and any remaining reference locations (e.g., other source images surrounding the perimeter of the original source image within the composite image). Such two-dimensional blending will employ methods such as bilinear interpolation to effect the color blending between adjacent reference location triples. Moreover, the color transformer may perform the color transforms between reference locations either in series, parallel, or a combination thereof. The color transform operation is also repeatable for each source image, or for a selection of source images within the composite image.

In another embodiment, an S-curve interpolation is used when performing the color transform. That is, the weight that each reference will be given during the equation will be based on an S-curve function versus a linear function. For example, the weight of the closest reference location will be quickly reduced in comparison with the weight of the further reference location as the color transformer covers the two distances. In so doing, the image will more quickly become a combination of the two colors as opposed to a linear combining effect. An S curve is an interpolating function that is continuous in its first derivative at all points. In contrast, a linear interpolant may be discontinuous at its endpoints. In another embodiment, the color transformer may use any or a plurality of different modeling methods for weighing the value of each reference location and performing the interpolation and color transform.

Figure 9:
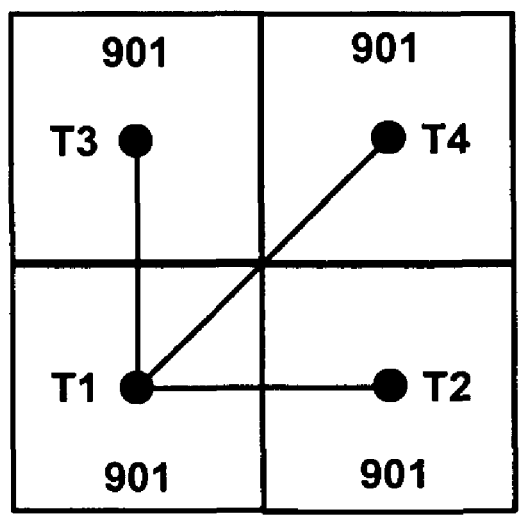
FIG. 9 is a block diagram of an exemplary color blending configuration across a seamless composite image without requiring overlap of source images in accordance with one embodiment of the present invention.

With reference now to FIG. 9, a block diagram of an exemplary color blending configuration across a seamless composite image without requiring overlap of source images is shown in accordance with one embodiment of the present invention. In general, composite image 900 is formed in the same manner as described herein including the description of FIGS. 4A-4D. That is, composite image 900 is formed from a plurality of source images 901 in a method that does not require overlap between the source images 901 in order to obtain the composite image 900.

However, unlike FIGS. 4A-4D, in one embodiment, a plurality of reference locations (e.g., T1-T4) is also provided. Although a reference location is shown in each source image 901, each source image may have more or fewer. Moreover, each source image 901 may have a number of reference locations that is different from the source image 901 on any given side. In one embodiment, the reference location, e.g., T1, is in the center of the source image 901. However, the reference location, e.g., T1, may be at any area or in any location within the source image 901, depending upon circumstances of the image relative geometry. The utilization of the reference locations T1-T4 in the center of the source images 901 is provided herein merely for purposes of brevity and clarity. Moreover, the utilization of reference locations not in the center are also shown and described in more detail with respect to FIG. 10B.

Figure 10A:
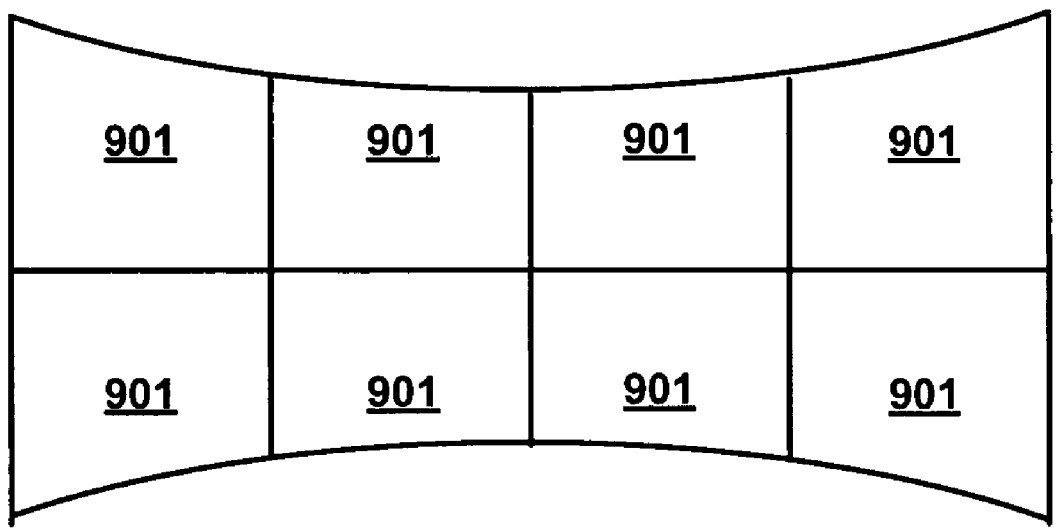
FIG. 10A is a block diagram of an exemplary seamless composite image configuration in accordance with one embodiment of the present invention.

With reference now to FIG. 10A, a block diagram of an exemplary seamless composite image 1000 configuration is shown in accordance with one embodiment of the present invention. In general, the source images 901 of exemplary seamless composite image 1000 provide an opportunity for a user to define the actual shape of the area being imaged. For example, seamless composite image 1000 includes a plurality of images 901 which are to be combined to form a seamless image.

However, if the images 901 are merely combined without overlap or cropping they will form a composite image 1000 that does not have a well defined shape due to imager look angles, field of views, etc. In one embodiment, the misshapen composite image 1000 may be the user preferred image, and as such, there will be no shaping of the combined seamless image. In that case, the color blending will be performed in a manner similar to that described in FIG. 9 herein. However, in another embodiment, a shaped image may be preferred as is shown and described in FIG. 10B.

Figure 10B:
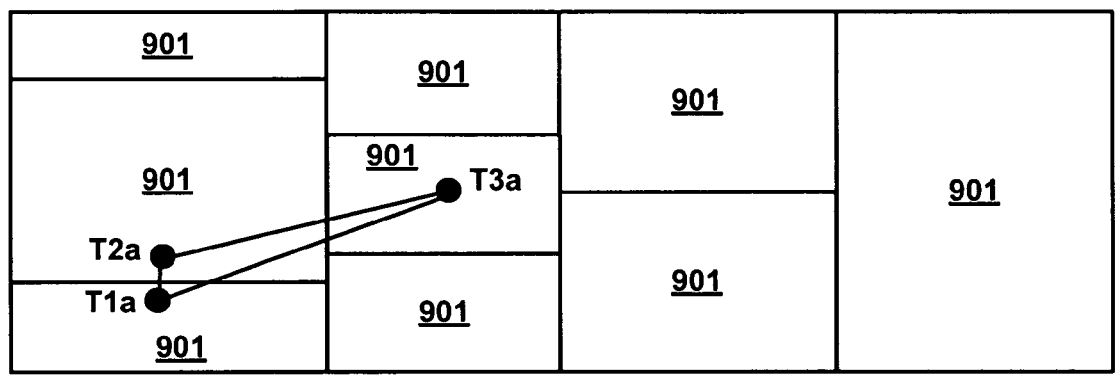
FIG. 10B is a block diagram of an exemplary color blending configuration across a seamless composite image with a plurality of overlap areas in accordance with one embodiment of the present invention.

With reference now to FIG. 10B, a block diagram of an exemplary color blending configuration across a seamless composite image 1050 with a plurality of overlap areas and non-overlap areas shown in accordance with one embodiment of the present invention. In other words, instead of utilizing the entire composite image 1000, portions of the outside of composite image 1000 will be overlaid, cropped, etc. to form a cleanly shaped image 1050. For example, this may be used to save pixels, reduce overall bandwidth or otherwise clean up an image. Although composite image 1050 is shown as a rectangle, embodiments described herein are well suited to any composite image 1050 such as a wide screen shape, a regular display screen shape, a non-standard shape, a geometric shape, or any other type of composite image 1050 that a user may desire as the composite image.

Moreover, FIG. 10B also includes a plurality of reference locations (T1a-T3a). Although a reference location is not shown in each source image 901, each source image may have more or fewer. Moreover, each source image 901 may have a number of reference locations that is different from the source image 901 on any given side. In one embodiment, the reference location, e.g., T2a, is off center of the source image 901. However, the reference location, e.g., T2, may be at any area or in any location within the source image 901.

Figure 11:
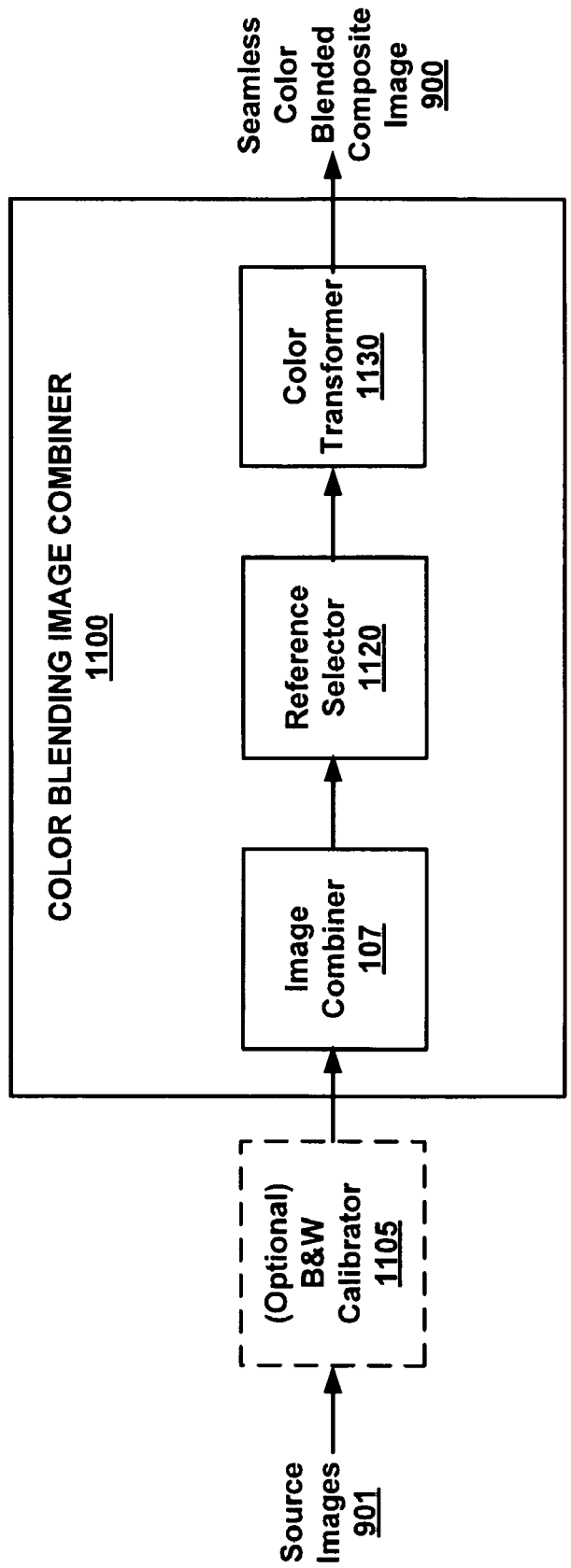
FIG. 11 is a block diagram of an exemplary color blending image combiner in accordance with one embodiment of the present invention.

With reference now to FIG. 11, a block diagram of an exemplary color blending image combiner 1100 is shown in accordance with one embodiment of the present invention. Exemplary color blending image combiner 1100 includes an image combiner 107, a reference selector 1120 and a color transformer 1130. In general, exemplary color blending image combiner 1100 receives a plurality of source images 901 from a plurality of imagers (e.g., 101-105 of FIG. 1B) and outputs a seamless color blended composite image 900. The details of the operation of exemplary color blending image combiner 1100 are provided in the description of FIG. 12.

In one embodiment, exemplary color blending image combiner 1100 also includes a black and white calibrator 1105 that performs a black and white calibration on the plurality of imagers prior to the imagers providing the source images 901. In general, the black and white calibrator 1105 establishes an image black and white point for any or all of the plurality of source images 109. Color transformer 1130 then utilizes the black and white point within the source images 109 to provide a mapping basis when performing the color transform. Although in one embodiment, the black and white calibrator 1105 is included within the operation of color blending image combiner 1100, the present technology is well suited to performing the black and white calibrator 1105 calibration during initial imager install, during scheduled maintenance, on a periodic basis, and the like. In another embodiment, color blending image combiner 1100 includes a color correction function such as described in detail herein.

Image combiner 107 is described in detail herein including FIG. 1B and is not repeated herein for purposes of brevity and clarity. Reference selector 1120 is utilized to select one or more points of reference within any or all of the source images 109. Color transformer 1130 utilizes a transform such as those described herein to blend the color across the source images 901 within the composite image (such as image 900). In general, color transformer 1130 ensures that transitions between source images 901 in the composite image 900 are not observed, take effect smoothly and are independent of the local illuminant and the color processing of the individual imagers (such as imagers 101-105 of FIG. 1B).

Referring now to FIG. 12, a flowchart 1200 of a method for color blending seamless composite images without requiring overlap of source images 901 is shown in accordance with one embodiment of the present invention.

With reference now to 1202 of FIG. 12 and to FIGS. 1A and 1B, one embodiment acquires a plurality of source images 901 from a plurality of imagers. In one embodiment, prior to acquiring the plurality of source images 901 from the plurality of imagers, a color calibration is performed on the source images 901.

In general, the color calibration process accesses an imaged reference color set including at least one reference color. In other words, an image including a set of reference colors is captured. In one embodiment, the imaged reference color set may be the only object in the captured image, or may also be in a captured image of a subject. In another embodiment, the subject may be any person, place, or thing whose image can be captured.

Typically, the quality and spectral characteristics of light falling on a given subject affect the subject's appearance to an imager and thus on the source image generated by the imager. In many cases, the imager itself, through physical characteristics of its design and fabrication of its sensor, and also through internal processing characteristics of the imager, introduces further alteration in the perceived coloration of the subject. These effects combine to make coloration metrics of the imaged subject highly imager dependent.

By viewing a set of reference colors captured in essentially the same ambient lighting conditions and processing parameters as the image of the subject, a transformation may be determined. That is, a transformation from the observed color space of the captured image to a reference or "true" color space. Wherein the "true" color space is independent of the ambient lighting conditions and image processing capabilities of the imager which captures the image.

For example, a control reference color set including at least one control color corresponding to at least one reference color is accessed. That is, the true color space is represented by a control reference color set including a color or colors that correspond with the color or colors of the imaged reference color set. However, the control reference color set may include a logical reference color set in which the spectral reflectance and color signal values of reference color set in the captured image are accessed, rather than an actual physical entity.

Then, a color correction function is generated. The color correction function eliminates a discrepancy between the at least one reference color and the corresponding control color. By comparing the characteristics of the control reference color set with the characteristics of the imaged reference color set captured in the image, a transformation, or "color correction function" can be determined. In general, the color correction function will account for the discrepancy between the characteristics of the imaged reference color set and the control reference color set. This color correction function directly compensates for the combined effect of the ambient lighting in the room and the color transformation of the acquiring imager.

To facilitate determining this reference transformation, the imaged reference color set is detected within the image. Moreover, the observed characteristics of the imaged reference color set are measured. A color correction function is then determined. In general, the color correction function will bring color descriptions of the imaged reference color set closer to the color values of control reference color set. This color correction function can then be applied to the captured image, or subsequently captured images, so that the colors in the source images 901 more accurately convey the true colors of a subject.

In so doing, the combined effects of the ambient lighting conditions at the location at which the image is captured as well as device characteristics and the image processing capabilities of the image capture system can be inferred. These combined effects are then substantially eliminated from the image such that a more accurate representation of the color of the subject can be conveyed. In one embodiment, the color correction function may be generated and applied by the image capture device itself, by a device displaying an image, as a service by a third party, or any combination thereof. Further detail of the color correction function and operation can be found in copending patent application Ser. No. 11/233,600, entitled "True Color Communication," filed Sep. 9, 2005, and assigned to the assignee of the present technology, the disclosure of which is hereby incorporated by reference.

In another embodiment, prior to acquiring the plurality of source images 901 from the plurality of imagers, a black and white calibration is performed on the plurality of imagers. In general, the black and white calibration establishes an image black and white point for each of the plurality of source images 901 received from the plurality of imagers. As described herein, the image black and white point for each of the plurality of source images 901 is further utilized to provide a mapping basis for performing the color transform.

Referring still to 1202 of FIG. 12 and to FIGS. 1A and 1B, one embodiment combines the plurality of source images 901 to produce a seamless composite image. For example, as described herein, combiner 107 combines the source images 901 that are acquired by imagers 101-105 to produce a seamless composite image (e.g., virtual image, mosaic image etc.). In one embodiment, the composite image is created in a manner that does not require overlap of an image region of the acquired image. In one embodiment, this is accomplished by using line features to combine the source images 901 (see discussion made with reference to FIG. 3). The line features enable the combiner 107 to identify relationships that exist among the source images 901 that can be utilized to combine the source images 901 seamlessly.

In operation, imager system 100 can be situated so that objects that are desired to be imaged are located within its imaging plane, e.g., plane of focus (POF), shared or common observation plane, etc., (see discussion made with reference to FIG. 1C). In one embodiment, a plurality of imagers is configured to capture respective source images 901 from respective portions of the shared observation plane. In the present embodiment, seamless composite images are formed by combining the source images 901 using a resampling mechanism that utilizes homographies based on line features.

With reference now to 1204 of FIG. 12 and to FIG. 9, one embodiment selects a first reference location T1 in a first source image 901 and a second reference location T2 in a second source image 901 of the composite image. In another embodiment, a reference location is selected in n of the plurality of source images 901. As shown in FIG. 9, in one embodiment the reference location T1 is at a center of the first source image 901 and the reference location T2 is at a center of the second source image 901.

However, as shown in FIG. 10B, the reference location T1a is at a boundary point of a first source image 901, the reference location T2a is at a boundary point of a second source image 901 and reference location T3a is at a center of a third source image 901. In other words, the reference location may be anywhere within the source image 901. Moreover, there may be any number of reference locations within a particular source image 901 or there may be no reference locations within a particular source image 901.

Referring now to 1206 of FIG. 12 and to FIG. 9, one embodiment performs a color transform blending/interpolation in the direction between the reference location T1 in the first source image 901 and the reference location T2 in the second source image 901 to produce a seamless color blended composite image 900 without requiring overlap of image regions of the plurality of source images 901. In another embodiment, the color transform interpolation is performed between the reference locations in the n references to produce a seamless color blended composite image.

The color transform is utilized to smoothly blend the plurality of source images 901 within the composite image 900. In other words, by utilizing the color transform interpolation, most or all of the color disparities between the adjoining source images 901 can be resolved. For example, in composite image 900, the color transform utilizes the reference locations T1-T4 to accomplish the blending or smooth transition between each of the four source images 901. In one embodiment, prior to the color blending performed by the color transformer 1130, the source images 901 have been color corrected. However, in another embodiment, the source images 901 have not been color corrected.

The present discussion will utilize source image 901 having reference location T1 therein as the initial reference location to be blended with the other three adjacent source images 901. In general, for each adjacent source image 901, the reference location T1 will be weighed against each other source image 901 reference locations (e.g., T2-T4). For example, the discussion will focus on the blending of the colors of source image 901 with reference T1 (referred to herein as T1) and source image 901 with reference T2 (referred to herein as T2).

In the present example, a linear (and bilinear) interpolation is used for performing the color transform. However, this transform is merely one of a plurality of interpolation methods which may be utilized in conjunction with the present technology. During the color transform process the input of T1 versus the input of T2 is weighed. That is, the weight of T1 is linearly compared with the weight of T2 across the two source images 901. For example, a line is drawn between T1 and T2. Color transformer 1130 then calculates the color adjustment to be performed on the composite image 900 based on the color transform input at T1, the color transform input at T2 and the proximity thereto.

For example, T1 provides a color red with a value of 15 and T2 provides a color red with a value of 20. When the color transform begins a linear interpolation (at T1) the result is 100% T1 and 0% T2 provided to the color transformer 1130. In so doing, the location of T1 will remain the color red with a value of 15. However, as the color transform moves along the distance between T1 and T2, the transform input weight of both reference locations will change. For example, at 25% from T1 color transformer 1130 will take 75% of T1 and 25% of T2 to establish the corrected color transform. This will continue along the distance until the color transformer 1130 reaches T2 at which point, the result is 0% T1 and 100% T2 provided to the color transformer 1130. That is, the location of T2 will remain the color red with a value of 20.

In so doing, the imagery between the two reference locations will be smoothly blended without requiring any type of overlap between the source images 901. Moreover, color transformer 1130 will continue to perform the color transform between T1 and each remaining reference location (e.g., T3 and T4) either in series, parallel, or a combination thereof. Although, the transform method described utilized the center reference location of FIG. 9, the description is also well suited for the transform between other than reference locations such as T1a-T3a as shown in FIG. 10B.

In another embodiment, an S-curve interpolation is used for performing the color transform. That is, the weight that each reference will be given during the equation will be based on an S-curve function versus a linear function. For example, the weight of the closest reference location will be quickly reduced in comparison with the weight of the further reference location as color transformer 1130 travels between the two reference locations. In so doing, the composite image will more quickly become a combination of the two colors as opposed to a linear combining effect. In another embodiment, color transformer 1130 may use any or a plurality of different modeling methods for weighing the value of each reference location and performing the interpolation and color transform.

As one skilled in the art will appreciate, blending and interpolation as described herein is intended to effect two dimensional images, and the use of linear (or S-curve) interpolants will be replaced with bilinear (or bi-S-curve) interpolants wherever image adjacency relationships will support this.

Thus, embodiments of the present invention provide an automated method and system for color blending seamless composite images having non-uniform resolution. Embodiments further provide color blending seamless composite images having non-uniform resolution that is color calibrated for automated color correction. Embodiments also provide a composite image with smooth blending and a lack of observable color transition areas within the source images forming the composite image without requiring overlap of the source images.

Embodiments of the present invention are thus described. While the present invention has been described in particular embodiments, it should be appreciated that the present invention should not be construed as limited by such embodiments, but rather construed according to the following claims.

What is claimed is:

1. A method for color blending seamless composite images without requiring overlap of source images, said method comprising:
  combining said plurality of source images from a plurality of imagers to produce a seamless composite image;
  selecting a first reference location in a first source image and a second reference location in a second source image of said composite image; and
  performing a color transform in the direction between said reference location in said first source image toward said reference location in said second source image to produce a seamless color blended composite image without requiring overlap of image regions of said plurality of source images.

2. The method of claim 1 further comprising:
  selecting a reference location in n of said plurality of source images; and
  performing a color transform in the directions between adjacent said reference locations in said n references to produce a seamless color blended composite image.

3. The method of claim 1 further comprising:
  selecting said reference location in said first source image at a center of said first source image; and
  selecting said reference location in said second source image at a center of said second source image.

4. The method of claim 1 further comprising:
  utilizing a linear interpolation for performing said color transform.

5. The method of claim 1 further comprising:
  utilizing an S-curve interpolation for performing said color transform.

6. The method of claim 1 further comprising:
  selecting said reference location in said first source image at a boundary point of said first source image; and
  selecting said reference location in said second source image at a boundary point of said second source image.

7. The method of claim 1 further comprising:
  performing a black and white color calibration on said plurality of imagers;
  establishing an image black and white point for each of said plurality of source images received from said plurality of imagers based on said black and white color calibration; and
  utilizing said image black and white point for each of said plurality of source images to provide a mapping basis for performing said color transform.

8. A color blending image combiner comprising:

a combiner for combining a plurality of source images to produce a seamless composite image, a reference selector for selecting a reference location in a first source image of said plurality of source images and a second reference location in a second source image of said plurality of source images; and a color transformer for performing a color transform in the direction between said reference location in said first source image toward said reference location in said second source image to produce a seamless color blended composite image without requiring overlap of image regions of said plurality of source images.

9. The color blending image combiner of claim 8 wherein said reference selector selects a reference location for each of said plurality of source images.

10. The color blending image combiner of claim 9 wherein said color transformer provides color transforms in the direction between each said reference location toward each of adjacent said plurality of source images.

11. The color blending image combiner of claim 8 wherein said reference selector selects a center portion of said first source image as said reference location of said first source image.

12. The color blending image combiner of claim 8 wherein said reference selector selects a boundary portion of said first source image as said reference location of said first source image.

13. The color blending image combiner of claim 8 wherein said color transformer utilizes a linear interpolation to perform said color transform between said reference location in said first source image and said reference location in said second source image.

14. The color blending image combiner of claim 8 wherein said color transformer utilizes an S-curve interpolation to perform said color transform between said reference location in said first source image and said reference location in said second source image.

15. The color blending image combiner of claim 8 further comprising:

a black and white calibrator for performing a black and white calibration on said plurality of imagers and establishing an image black and white point for each of said plurality of source images to provide a mapping basis for performing said color transform.

16. A method for color blending seamless composite images without requiring overlap of source images, said method comprising:

acquiring a plurality of source images from a plurality of imagers having a black and white calibration performed thereon;

combining said plurality of source images to produce a seamless composite image;

selecting a reference location in a first source image of said plurality of source images and a reference location in a second source image of said plurality of source images of said seamless composite image; and performing a color transform in the direction between said first reference location in said first source image toward said second reference location in said second source image to produce a seamless color blended composite image without requiring overlap of image regions of said plurality of source images.

17. The method of claim 16 further comprising:

selecting at least one reference location in each of n source images of said plurality of source images; and performing color transforms in the directions between said one reference location toward each adjacent of n source images to produce a seamless color blended composite image.

18. The method of claim 16 further comprising:

selecting said first reference at a center of said first source image; and selecting said second reference at a center of said second source image.

19. The method of claim 16 further comprising:

utilizing a linear interpolation to perform said color transform.

20. The method of claim 16 further comprising:

utilizing an s-curve interpolation to perform said color transform.

* * * * *